United States Patent Office 3,269,765
Patented August 30, 1966

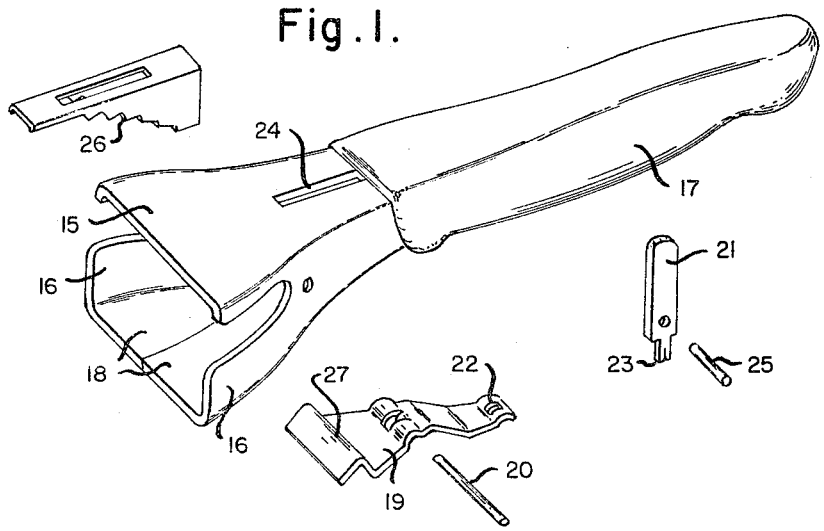
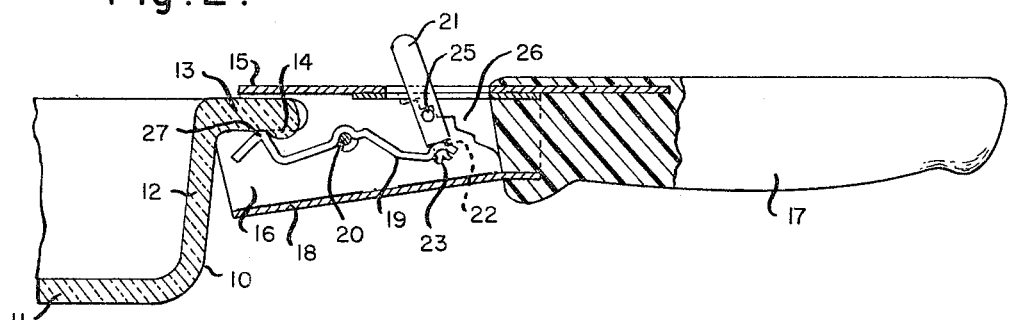
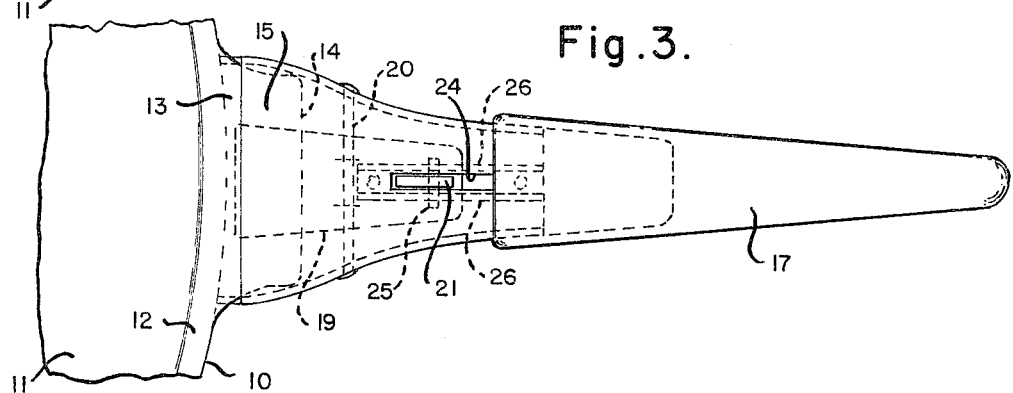

3,269,765
DETACHABLE HANDLES
Vaughn K. Pryce, 417 4th St., Derry, Pa.
Filed Nov. 3, 1964, Ser. No. 408,560
7 Claims. (Cl. 294—31)

This invention relates to detachable handles and particularly to a handle adapted to be removably applied to a fry pan, casserole or like cooking vessel having one or more outwardly extending lugs or lips. There are on the market a variety of glass and ceramic cooking vessels which have a flat bottom and an upwardly extending flange defining the body of the vessel which flange has on its upper edge at least one outwardly extending lug or lip. Such cooking vessels are made and sold by Corning, Anchor Hocking and Owens-Illinois glass companies.

It is essential in a detachable handle for the service here contemplated, that the handle tightly engage the lug or lip without scoring or otherwise damaging the glass or ceramic surface or otherwise setting up strains. It is also essential that the handle hold the vessel sufficiently tightly to permit its being turned from the horizontal to the vertical plane without loss of engagement.

I have invented a detachable handle which when once connected to the cooking vessel cannot be accidentally disconnected or removed. The handle of my invention will not score or otherwise injure the glass surface of the lug or lip. A very significant feature of my invention is that it will vary the grasping opening to accommodate reasonable variations in the thickness of the lug so that the lug is always firmly engaged. This feature is unique in the structure of my invention and cannot be accomplished by any detachable handle presently available to my knowledge.

In a preferred embodiment of my invention I provide a detachable handle of the character described comprising a hand gripping portion, a fixed gripping jaw integral with the hand gripping portion, said fixed jaw having depending spaced flanges at opposite sides thereof, a movable gripping jaw pivoted intermediate its ends in the depending flanges of said fixed jaw, a stepped cam depending from the fixed jaw adjacent the hand gripping portion, and lever means pivoted in the end of the movable gripping jaw adjacent the hand gripping portion and having a cam engaging member adapted to ride on the stepped cam, said lever means extending through an opening in the fixed gripping jaw and adapted to be moved vertically and horizontally therein to move the end of the movable jaw remote from the lever toward and away from the end of the fixed jaw remote from the hand gripping portion. Preferably the cam engaging member is a transverse pin through said lever adapted to ride on identical spaced apart parallel stepped cam surfaces on opposite sides of the lever means.

In the foregoing general description I have set out certain objects, advantages and purposes of my invention. Other objects, advantages and purposes of my invention will be apparent from a consideration of the following description and the accompanying drawings in which FIGURE 1 is an exploded isometric view of the detachable handle according to my invention;

FIGURE 2 is a side elevational view partly in section of a handle according to my invention showing the handle in locking engagement with a cooking vessel; and FIGURE 3 is a top plan view of the handle shown in FIGURE 2.

Referring to the drawings I have illustrated a conventional ceramic fry pan 10 having a bottom 11 and an upstanding flange 12 defining the fry pan. An integral lug 13 extends from the upper edge of the flange 12 generally parallel to the bottom 11 of the pan. The lug 13 is provided with a depending lip 14 at its outermost extremity.

The detachable handle of my invention is provided with an upper fixed jaw 15 having depending spaced flanges 16 at each side integral with a hand gripping portion 17.

The flanges 16 may be provided with inturned portions 18 welded together for rigidity if desired. A movable gripping jaw 19 is pivoted intermediate its ends on a pivot rod 20 fixed in the depending flanges 16. An operating lever 21 is pivoted in an opening 22 in the end of the gripping jaw 19 nearest the hand gripping portion 17 by a swaged end 23. The lever 21 extends vertically from the gripping jaw through a slot 24 in the fixed jaw 15. A pin 25 is provided in lever 21 intermediate its ends. This pin 25 is adapted to engage the steps of a stepped cam 26 depending from fixed jaw 15 between depending flanges 16. The movable gripping jaw 19 is provided with a rolled rib portion 27 on the end opposite lever 21 to engage the lug 13 of the fry pan behind the lip 14.

The handle of my invention is placed with the fixed jaw 15 on top of the lug 13 of the fry pan and the lever 21 is moved downwardly and rearwardly toward the hand gripping portion 17 with the thumb of the user so that the pin 25 moves along the stepped cams 26. This moves the rib 27 upwardly against lug 13 behind lip 14 by pivoting the movable jaw on pivot rod 20. In this locked position the fry pan may be lifted and tipped or turned with safety just as a conventional pan with an integral fixed handle.

The handle is removed by simple pushing the lever 21 toward the pan thus causing pin 25 to move upwardly along the stepped cams and releasing the rib 27 by lowering it from the lug 13.

While I have illustrated and described a presently preferred embodiment of my invention, it will be understood that this invention may be otherwise embodied within the scope of the following claims.

I claim:

1. A detachable handle for cooking utensils having a projecting lug comprising a hand gripping portion, a fixed gripping jaw integral with the hand gripping portion, said fixed jaw having depending spaced flanges at opposite sides thereof, a movable gripping jaw pivoted intermediate its ends in the depending flanges of said fixed jaw, a stepped cam depending from the fixed jaw adjacent the hand gripping portion, and lever means pivoted in the end of the movable gripping jaw adjacent the hand gripping portion and having cam engaging means adapted to ride on said stepped cam, said lever means extending through an opening in the fixed gripping jaw and adapted to be moved vertically and horizontally therein to move the end of the movable jaw remote from the lever toward and away from the end of the fixed jaw remote from the hand gripping portion.

2. A detachable handle as claimed in claim 1 wherein the stepped cam means is made up of a pair of stepped cams, one on each side of the lever opening in the fixed jaw between which said lever moves.

3. A detachable handle as claimed in claim 1 wherein the depending spaced flanges are slotted to engage the projecting lug on opposite sides of the movable gripping jaw.

4. A detachable handle for cooking utensils having a projecting lug comprising a hand gripping portion, a fixed gripping jaw integral with the hand gripping portion, said fixed jaw having depending spaced flanges at opposite sides thereof, a movable gripping jaw pivoted intermediate its ends in the depending flanges of said fixed jaw, a stepped cam on the fixed gripping jaw adjacent the hand gripping portion, and lever means pivoted in the movable jaw adjacent the hand gripping portion and having cam engaging means adapted to ride on said stepped cam, said lever means extending through an opening in the fixed gripping jaw and adapted to be moved horizontally therein to move the end of the movable jaw remote from the lever toward and away from the end of the fixed jaw remote from the hand gripping portion.

5. A detachable handle as claimed in claim 4 wherein the stepped cam means is made up of a pair of stepped cams, one on each side of the lever in the fixed jaw between which said lever moves.

6. A detachable handle for cooking utensils having a projecting lug with a depending lip remote from the utensil comprising a hand gripping portion, a fixed gripping jaw integral with the hand gripping portion, said fixed jaw having depending spaced flanges at opposite sides thereof, a movable gripping jaw pivoted intermediate its ends in the depending flanges of said fixed jaw, gripping means on the end of the gripping jaw remote from the hand gripping portion of the first jaw engaging the lug behind the depending lip, a stepped cam depending from the fixed jaw adjacent the hand gripping portion, and lever means pivoted in the end of the movable gripping jaw adjacent the hand gripping portion and having cam engaging means adapted to ride on said stepped cam, said lever means extending through an opening in the fixed gripping jaw and adapted to be moved vertically and horizontally therein to move the end of the movable jaw remote from the lever toward and away from the end of the fixed jaw remote from the hand gripping portion.

7. A detachable handle as claimed in claim 6 wherein the gripping means is an upstanding rib on the movable gripping jaw.

References Cited by the Examiner

UNITED STATES PATENTS

| D. 201,904 | 8/1965 | Levy | 294—31 X |
| 1,840,775 | 1/1932 | Hardy | 294—31 |

GERALD M. FORLENZA, *Primary Examiner.*

G. F. ABRAHAM, *Assistant Examiner.*